United States Patent Office 2,797,243
Patented June 25, 1957

2,797,243

IMPROVED METHOD FOR CONVERTING l-AMPHETAMINE INTO d-l-AMPHETAMINE

Elmer E. Hartgerink, Zeeland, Mich., assignor to Miles Laboratories, Inc., Elkhart, Ind., a corporation of Indiana No Drawing. Application October 21, 1953,
Serial No. 387,551

3 Claims. (Cl. 260—570.8)

This invention relates to a new and improved method for obtaining greater yields of a desired optically active isomer from racemic mixtures and more particularly to a method wherein optically active isomers are converted to the corresponding optically inactive racemic mixtures.

In the separation of optically active isomers as, for example, d-amphetamine from the racemic mixture, by any of the known means, for example, by crystallization from a solution of mixed acid d-tartrates, there is obtained in the course of such separation a "by-product" which is rich in the laevo isomer and which contains some of the dextro isomer.

Up to recently the aforesaid by-product mixture has been of little or no commercial value. In my copending application, Serial No. 340,140 filed March 3, 1953, now abandoned, it is disclosed that under certain conditions the conversion of optically active isomers to the racemic form can be accomplished economically and in good yield. As there disclosed, I have discovered that the racemization of optically active isomers can be expedited to a significantly improved degree by performing the racemization in the presence of a catalyst and a mixture of hydrogen and ammonia gas.

By way of specific illustration, the following procedures may be employed to racemize optically active compounds, as for example, compounds of the phenyl-isopropylamine type, such as d-or l-amphetamine, and the like.

*Example 1*

A mixture of 50 grams of l-amphetamine and 5 grams of Raney nickel was charged into a Magne-Dash autoclave and the bomb pressurized with hydrogen to an initial pressure of 100 lbs. The mixture was stirred and heated at 95–100° C. for 5 hours, after which time the reaction was cooled and the nickel removed by filtration. The treated base showed a rotation of −3.1°. This would amount to about 65% racemization of the laevo base present.

*Example 2*

A mixture of 135 grams of laevo amphetamine, 50 grams of Raney nickel and 1.7 grams of ammonia gas in 10 cc. of methyl alcohol was charged into a Magne-Dash bomb and pressurized to 100 lbs. with hydrogen. Then the mixture was heated to 150° C. and maintained at this temperature with stirring for 19 hours. The reaction was then cooled, the gases vented, and the reaction mixture filtered to remove nickel catalyst. A 50 gram aliquot was distilled yielding 37.4 grams (75%) of amphetamine; B. P. 83°–87°/15 mm., and 4.8 grams of residue consisting of diamine. The rotation of the essentially dl-amphetamine was −0.3°.

*Example 3*

A mixture of 135 grams of laevo amphetamine, 50 grams of Raney nickel and 0.5 gram of ammonia gas in 10 cc. methyl alcohol, was charged into a Magne-Dash autoclave and pressurized to an initial pressure of 100 lbs. with hydrogen. The reaction was heated at 150° C. with stirring for 13½ hours. The gases were vented from the cooled reaction vessel, and the mixture filtered to remove catalyst. A 50 gram aliquot sample was distilled under reduced pressure to yield 37.4 grams of amphetamine; boiling point 83°–86°/15 mm., and a residue of diamine weighing 10.4 grams. The yield of amphetamine was 74.5%, and the rotation of essentially dl-amphetamine was −0.2°.

*Example 4*

A mixture of 50 grams of laevo amphetamine, and 5 grams of Raney nickel catalyst, was charged into a Magne-Dash autoclave, the autoclave purged four times with nitrogen gas to remove air, and then finally pressurized to 50 lbs. with nitrogen and heated in this atmosphere for 20 hours at 150° C. The reaction was then cooled to room temperature, the gases vented and the contents removed and filtered to remove catalyst. The material was distilled under reduced pressure to yield 25.5 grams of amphetamine; B. P. 80°–83° C./12 mm. and 14 grams of diamine. The yield of amphetamine was 51%, this yield being about the same as that obtained when the reaction is run in the presence of air. The rotation of the essentially dl-amphetamine was −0.1°.

*Example 5*

A mixture of 50 grams of laevo amphetamine, 5 grams of Raney nickel, and 7 grams of ammonia gas in 30 cc. of cold methyl alchol was charged to a Magne-Dash autoclave, and the reactor pressurized to an initial pressure of 30 lbs. with hydrogen. The mixture was heated at 150° C. with stirring for 13 hours.

The reaction was then cooled and the contents of the autoclave poured out and the catalyst removed by filtration. The methanol was distilled off, and the residual oil fractionated under reduced pressure. A fraction was collected at 83°–86° C./15 mm., which was dl-amphetamine and which amounted to 39.4 grams (79%). A still residue consisting of diamine and weighing 4 grams was also obtained. The rotation of essentially dl-amphetamine was −0.1°.

*Example 6*

A mixture of 50 grams l-amphetamine, and 5 grams of Raney nickel catalyst was placed in a Magne-Dash bomb and pressurized to 100 lbs. with hydrogen. The reaction was heated at 150°–155° C. for 17 hours, the pressure during this period rising to 150 lbs. The reaction was cooled and vented, the catalyst allowed to settle, and the amphetamine decanted from it. The base was amber colored and distilled under reduced pressure, a low boiling fraction, boiling at 60°–80° C./15 mm. being collected. The amphetamine was collected at 82°–86°/15 mm. and weighed 25 grams (50%) yield. Completely racemized (rotation 0.0) dl-amphetamine was obtained. The above catalyst was reused and heated with 36 grams of l-amphetamine and 75 lbs. initial pressure of hydrogen at 150° C. for 14½ hours; the base was then decanted and distilled. 19.7 grams of amphetamine was thus obtained (55%) boiling point 82°–86°/15 mm. The rotation was −0.30 indicating nearly complete racemization.

*Example 7*

35.5 grams of laevo-amphetamine was charged into a Magne-Dash bomb containing used Raney nickel catalyst. This mixture was cooled in ice, and treated with a cold solution of 2.2 grams of ammonia gas and 10 cc. of methyl alcohol. This mixture was then shaken in an atmosphere of hydrogen (initial pressure 100 lbs.) and at 150–155° C. for 10 hours. During the heating period a pressure of 250 lbs. was developed. The bomb was cooled, the nickel catalyst allowed to settle and the base poured out by decantation. The solvent methanol was removed under reduced pressure and the residual oil fractionated. Boiling point of the material was 82°–86°/15 mm. The yield was 30 grams (85%) no forerun and only a small amount of still residue. The rotation was —2.4.

From the above it is seen that the use of ammonia together with hydrogen results in a surprising and unexpected increase in yield. The amount of ammonia is of course variable, although I have found that about .015 mole of ammonia on the basis of amphetamine should be used.

While the specific examples have been directed to the racemization of amphetamine, it is of course obvious to the skilled in the art, that the method is likewise applicable to the racemization of any compounds containing an asymmetric carbon in the molecule.

It is understood, of course, that the process is also susceptible to other variations within the skill of the art, and that because of the inter-dependence of such factors as time, temperature, pressure and the like, these factors may be varied without going outside the scope of the present invention.

I claim:

1. The process which comprises heating a material rich in l-amphetamine with a nickel catalyst, and in an atmosphere of hydrogen and ammonia gas and removing optically inactive dextro-laevo amphetamine from the resulting mixture.

2. In a process for producing d-amphetamine from racemic amphetamine, wherein, a material rich in l-amphetamine is also obtained, the steps of heating said material rich in l-amphetamine with a nickel catalyst and in an atmosphere of ammonia and hydrogen whereby to convert said l-amphetamine to optically inactive racemic amphetamine, and then resolving the last said optically inactive amphetamine.

3. The process of claim 2, wherein, the said heating is accomplished under super-atmospheric pressure, and the catalyst is Raney nickel.

References Cited in the file of this patent
UNITED STATES PATENTS
2,608,583    Aschner _____ Aug. 26, 1952